US012774055B2

(12) United States Patent
Van Druten

(10) Patent No.: US 12,774,055 B2
(45) Date of Patent: Oct. 27, 2026

(54) BICYCLE GEAR CHANGING APPARATUS

(71) Applicant: Classified Cycling BV, Antwerp (BE)

(72) Inventor: Roëll Marie Van Druten, Eindhoven (NL)

(73) Assignee: Classified Cycling BV, Antwerp (BE)

( * ) Notice: Subject to any disclaimer, the term of this patent is extended or adjusted under 35 U.S.C. 154(b) by 0 days.

(21) Appl. No.: 19/201,184

(22) Filed: May 7, 2025

(65) Prior Publication Data

US 2025/0346324 A1 Nov. 13, 2025

(30) Foreign Application Priority Data

May 8, 2024 (NL) ..................................... 2037661

(51) Int. Cl.
*B62M 25/08* (2006.01)
*B62M 9/122* (2010.01)

(52) U.S. Cl.
CPC ............ *B62M 25/08* (2013.01); *B62M 9/122* (2013.01)

(58) Field of Classification Search
CPC ........ B62M 25/08; B62M 9/122; B62M 9/06; B62M 11/04; B62K 23/02
See application file for complete search history.

(56) References Cited

U.S. PATENT DOCUMENTS 8,958,962 B2 * 2/2015 Miki ...................... B62K 23/06 74/488
9,151,379 B2 * 10/2015 Kuroda .................. B62M 25/04
9,302,737 B2 * 4/2016 Kuroda .................. B62M 9/122
9,469,377 B2 * 10/2016 Kuroda ................. F16H 59/044
10,766,569 B2 * 9/2020 Kasai ..................... B62M 9/122
11,066,122 B2 * 7/2021 Suzuki ...................... B62L 3/00
11,772,746 B2 * 10/2023 Van Druten ........... B62K 25/02 74/501.6
12,103,635 B2 * 10/2024 Van Druten ........... B62K 25/02
12,145,689 B2 * 11/2024 Van Druten ........... B62M 9/122
2012/0245809 A1 * 9/2012 Ichida .................... B62M 25/08 701/51

(Continued)

FOREIGN PATENT DOCUMENTS

IT MI20121990 A1 5/2014

OTHER PUBLICATIONS

"Dutch Application No. 2037661, Search Report dated Dec. 11, 2024", (Dec. 11, 2024), 10 pgs.

*Primary Examiner* — Henry Y Liu
(74) *Attorney, Agent, or Firm* — Schwegman Lundberg & Woessner, P.A.

(57) ABSTRACT

A gear changing apparatus comprises a controller operatively coupled to a first switch to receive a first shift signal and to a second switch to receive a second shift signal. The controller controls at least one of a first and second gear changing device of a bicycle transmission to change a transmission ratio of the bicycle transmission to a next higher or lower transmission ratio in accordance with at least one synchro-shift route in response to receiving the first or second shift signal. The controller controls only one of the first and second gear changing devices to change the transmission ratio of the bicycle transmission in response to receiving a third shift signal, different from the first shift signal, from the first switch or in response to receiving a fourth shift signal, different from the second shift signal, from the second switch.

17 Claims, 7 Drawing Sheets

(56) References Cited

U.S. PATENT DOCUMENTS

| | | | | |
|---|---|---|---|---|
| 2014/0290411 | A1* | 10/2014 | Kuroda | B62M 9/122<br>74/473.12 |
| 2014/0303859 | A1* | 10/2014 | Miki | B62M 25/08<br>701/60 |
| 2015/0073656 | A1* | 3/2015 | Takamoto | G06F 9/02<br>701/1 |
| 2015/0344103 | A1* | 12/2015 | Kuroda | B62M 9/122<br>701/56 |
| 2015/0344104 | A1* | 12/2015 | Kuroda | F16H 61/0213<br>701/52 |
| 2016/0185421 | A1* | 6/2016 | Komatsu | B62M 9/12<br>701/2 |
| 2020/0124151 | A1* | 4/2020 | Van Druten | F16H 37/0833 |
| 2020/0156739 | A1* | 5/2020 | Van Druten | B62K 25/02 |
| 2021/0354783 | A1* | 11/2021 | Van Druten | F16D 41/30 |
| 2023/0391421 | A1* | 12/2023 | Van Druten | B62K 25/02 |
| 2024/0294229 | A1* | 9/2024 | Van Druten | B62M 9/10 |

* cited by examiner

BICYCLE GEAR CHANGING APPARATUS

CLAIM FOR PRIORITY

This application claims the benefit of priority of Dutch Application No. 2037661, filed May 8, 2024, which is hereby incorporated by reference in its entirety.

FIELD OF THE INVENTION

The invention relates to a bicycle gear changing apparatus.

BACKGROUND TO THE INVENTION

Gear changing apparatus for bicycles are known. Bicycles, especially racing bicycles, traditionally comprise a first gear changing device, e.g. a rear derailleur, and a second gear changing device, e.g. a front derailleur, for shifting gears of the transmission system. Alternatives to derailleurs are formed by gear boxes, particularly at the hub and/or crank of the bicycle. More recently, electrically actuatable rear derailleurs, front derailleurs, internally geared hub transmissions, and internally geared crank transmissions are also being used. Such electrically actuatable gear changing devices are commonly controlled by a controller.

It is also known to provide what in the art is sometimes referred to as synchro-shifting. In synchro-shifting, the controller controls both the first gear changing device and the second gear changing device, in such a way that when the user commands an upshift or a downshift, the controller determines which one, or both, of the first and second gear changing devices needs to be actuated for the bicycle transmission as a whole to perform the requested upshift or downshift, respectively. Often, the controller stores, in a memory, one or more synchro-shift routes which prescribe which of the first and second gear changing devices are to be actuated to shift from one transmission ratio to the next (or previous).

Efforts are being made to make operation of the gear changing apparatus user-friendly and efficient. However, it has been found that user-friendliness and efficiency can still be improved.

SUMMARY OF THE INVENTION

It is an object to provide a bicycle gear changing apparatus that provides a high degree of user-friendliness and/or efficiency. It will be appreciated that the bicycle gear changing apparatus can be used in various vehicles, such as bicycles or other human powered vehicles or light electric vehicles, such as electric vehicles having an electric propulsion motor of 5 kW or less.

A bicycle gear changing apparatus comprises a controller configured to be operatively coupled to a first electrical switch and a second electrical switch. The first and second switches are each an electrical component that can selectively disconnect or connect a conducting path in an electrical circuit. The controller is configured to control a first gear changing device of a bicycle transmission and a second gear changing device of the bicycle transmission in response a shift signal received from the first switch and a shift signal received from the second switch. The object is to enable the user to perform more than two different shift actions using the first switch and the second switch. Hence, the bicycle cockpit is not cluttered with many switches, while providing much functionality.

Optionally, a smallest gear ratio step size achievable with the first gear changing device is smaller than a smallest gear ratio step size achievable with the second gear changing device. The first gear changing device can e.g. be an electrically actuatable rear derailleur, and the second gear changing device can be an electrically actuatable internal hub transmission or electrically actuatable internal crank transmission. Alternatively, the second gear changing device can e.g. be an electrically actuatable rear derailleur, and the first gear changing device can be an electrically actuatable internal hub transmission or electrically actuatable internal crank transmission. Alternatively, the first gear changing device can e.g. be an electrically actuatable rear derailleur, and the second gear changing device can be an electrically actuatable front derailleur. Alternatively, the second gear changing device can e.g. be an electrically actuatable rear derailleur, and the first gear changing device can be an electrically actuatable front derailleur.

Optionally, the first gear changing device and the second gear changing device are included in an electrically actuatable internal hub transmission. Optionally, the first gear changing device and the second gear changing device are included in an electrically actuatable internal crank transmission. Optionally, the first gear changing device is included in an electrically actuatable internal hub transmission, and the second gear changing device is included in an electrically actuatable internal crank transmission. Optionally, the first gear changing device is included in an electrically actuatable internal crank transmission, and the second gear changing device is included in an electrically actuatable internal hub transmission.

The first switch can be triggered by the user in a first way to provide a first shift signal. The first shift signal can e.g. be representative of a single closing and/or opening of the first switch (single click). The second switch can be triggered by the user in the first way to provide a second shift signal. The second shift signal can e.g. be representative of a single closing and/or opening of the second switch (single click). The first switch can be triggered by the user in a second way, different from the first way, to provide a third shift signal, different from the first shift signal. The third shift signal can e.g. be representative of a double closing and/or opening of the first switch (double click). The second switch can be triggered by the user in the second way to provide a fourth shift signal, different from the second shift signal. The fourth shift signal can e.g. be representative of a double closing and/or opening of the second switch (double click). Alternatively, the third shift signal can e.g. be representative of holding of the first switch for a longer time period (long press) than in the first way (short press). Alternatively, the fourth shift signal can e.g. be representative of holding of the second switch for a longer time period than in the first way (long press).

A method for control the first gear changing device and a second gear changing device of the bicycle transmission can comprise one or more modes. The modes can be user-selectable.

A first mode comprises, in response to receiving the first shift signal controlling at least one of the first gear changing device and the second gear changing device to change a transmission ratio of the bicycle transmission to a next higher transmission ratio in accordance with at least one synchro-shift route, such as a synchro-upshifting route. This response to the first shift signal is herein also referred to as a first gear changing action for short. The first mode comprises in response to receiving the second shift signal controlling at least one of the first gear changing device of the bicycle transmission and the second gear changing device of the bicycle transmission to change the transmission ratio of the bicycle transmission to a next lower transmission ratio in accordance with at least one synchro-shift route, such as a synchro-downshifting route. This response to the second shift signal is herein also referred to as a second gear changing action for short. Hence, user-actuation of the first switch in the first way commands an upshift according to a synchro-shift route, and user-actuation of the second switch in the first way commands a downshift according to a synchro-shift route. The synchro-downshifting route can be the same (but in reverse) as the synchro-upshifting route. Alternatively, the synchro-upshifting route can be different from the synchro-downshifting route. The first mode comprises in response to receiving the third shift signal controlling only one of the first and second gear changing devices. This response to the third shift signal is herein also referred to as a third gear changing action for short. Alternatively, or additionally, the first mode comprises in response to receiving the fourth shift signal the controlling only one of the first and second gear changing devices. This response to the fourth shift signal is herein also referred to as a fourth gear changing action for short. Hence, the user can forego shifting according to the synchro-shift route and specifically command a gearshift of either the first gear changing device or the second gear changing device. So as to not clutter the bicycle cockpit with many switches, the user can use the same first and second switches for commanding upshifting (with the first shift signal) or downshifting (with the second shift signal) according to a synchro-shift route, and for commanding a gearshift of only one of the first and second gear changing devices (with the third or fourth shift signal).

Using a single first switch for generating the first and third shift signal, and a single second switch for generating the second and fourth shift signals, may entail that the controller has to wait for a predetermined time to determine whether a user action is a single closing and/or opening of the switch (single click) or a double closing and/or opening of the switch (double click). Only if the second closing and/or opening does not occur within a predetermined time after the first closing and/or opening there is certainty that the user action was a single click and not a double click. Similarly, it may entail that the controller has to wait for a predetermined time to determine whether a user action is a long press or a short press. Only if the switch is released before expiration of a predetermined time after the first closing and/or opening there is certainty that the user action was a short press and not a long press.

According to an aspect, faster response of the controller to user interaction with the first and/or second switch can be obtained. Although described in view of the first switch, the following can apply both to the first and/or the second switch.

The first switch is an electrical component that can selectively disconnect or connect a conducting path in an electrical circuit. The first switch can be actuated and released. The actuating can e.g. be a depressing of a button, the moving of a lever, the rotating of a rotary button or the like. Herein, the switch is referred to as being in an “on” state while actuated, and being in an “off” state while released. It will be clear that is can depend on the controller and the further circuitry connecting the switch to the controller whether the “on” state is a conducting state of the switch and the “off” state is an open circuit state of the switch, or whether the “on” state is the open circuit state of the switch and the “off” state is the conducting state of the switch. The change from the “off” state to the “on” state is herein also referred to as the actuation flank, and the change from the “on” state to the “off” state is herein also referred to as the release flank.

A first way of achieving faster response can be as follows. Upon actuation of the first switch, the controller receives the actuation flank. In response to receiving the first actuation flank. Upon release of the first switch, the controller receives the release flank. The controller then determines the elapsed time between receiving the actuation flank and the release flank associated with the same switch actuation. Thereto, the controller may e.g. start a timer upon receiving the actuation flank and stop the timer upon receiving the release flank. Next, the controller compares the determined elapsed time with a predetermined threshold. If the determined elapsed time is less than the predetermined threshold, the controller determines that the switch actuation was representative of a short actuation, and determines that the signal is the first shift signal, and starts the controlling the first gear changing action as prescribed in response to receiving the first shift signal. If the determined elapsed time is more than than the predetermined threshold, the controller determines that the switch actuation was representative of a long actuation, and determines that the signal is the third shift signal, and starts the controlling the third gear changing action as prescribed in response to receiving the third shift signal. Alternatively, and even faster, if the controller determines that the time elapsed since receiving the actuation flank is equal to the predetermined threshold but the released flank has not yet been received, the controller determines that the switch actuation was representative of a long actuation, and determines that the signal is the third shift signal, and starts the controlling the third gear changing action as prescribed in response to receiving the third shift signal.

A second way of achieving faster response can be as follows. Upon receiving the release flank within a predetermined time frame for a single click after receiving an actuation flank, the controller can provisionally determine that the signal is the first shift signal, and start the controlling the first gear changing action as prescribed in response to receiving the first shift signal. As explained above, at this time it is not certain yet that the signal is indeed a first signal. The release flank can mark a single click, but can also be part of a first click of a double click. By already starting controlling the first gear changing action in response to receiving the provisionally determined first shift signal, a fast response to the user actuation of the first switch is possible. After some time, the controller may determine that a second actuation flank is detected within a predetermined time frame for a double click after the first actuation flank or first release flank. Then, the controller determines that the provisional determination that the signal was the first shift signal is false, and changes the determination to that the signal is the third shift signal. In response, the controller can abort the first gear changing action already started in response to the provisional first shift signal, and instead start the controlling the third gear changing action as prescribed in response to receiving the third shift signal.

A third way of achieving faster response can be as follows. Upon receiving the actuation flank, the controller can provisionally determine that the signal is the first shift signal, and start the controlling the first gear changing action as prescribed in response to receiving the first shift signal. As explained above, at this time it is not certain yet that the first signal is indeed a first signal. An actuation flank can be part of a single click, but can also be part of a first click of a double click. An actuation flank can be part of a short actuation, but, unless already a release flank has been received, can also be part of a long actuation. By already starting controlling the first gear changing action in response to receiving the provisionally determined first shift signal, a fast response to the user actuation of the first switch is possible. After some time, the controller may determine that a second actuation flank is detected within a predetermined time frame for a double click after the first actuation flank or release flank, or that no release flank has been received within the threshold for a short actuation. Then, the controller determines that the provisional determination that the signal was the first shift signal is false, and changes the determination to that the signal is the third shift signal. In response, the controller can abort the first gear changing action already started in response to the provisional first shift signal, and instead start the controlling the third gear changing action as prescribed in response to receiving the third shift signal.

It has been found that especially if the first gear changing action relates to controlling an electrically actuatable rear derailleur or electrically actuatable front derailleur, the determination that the provisional determination was false can be performed fast enough to abort the changing of the transmission ratio of the bicycle transmission with the derailleur, and perform the third gear changing action instead. However, also gear changing devices in electrically actuatable internal hub or crank transmission may also allow abort the changing of the transmission ratio. It will be appreciated that the controller can determine not to abort the first gear changing action. The controller can e.g. decide not to abort the first gear changing action if the first gear changing action has already progressed too far to be aborted without providing acceptable driving experience to the user. Also when the first gear changing action is not aborted, the third gear changing action can be performed in response to the changed determination that the signal is the third shift signal.

According to an aspect is provided a bicycle gear changing apparatus comprising a controller configured to be operatively coupled to the first switch to receive the first shift signal, and operatively coupled to the second switch to receive the second shift signal. The controller is configured to control at least one of the first gear changing device of the bicycle transmission and the second gear changing device of the bicycle transmission to change a transmission ratio of the bicycle transmission to a next higher transmission ratio in accordance with at least one synchro-shift route, such as the synchro-upshifting route, in response to receiving the first shift signal. The controller is configured to control at least one of the first gear changing device of the bicycle transmission and the second gear changing device of the bicycle transmission to change the transmission ratio of the bicycle transmission to a next lower transmission ratio in accordance with at least one synchro-shift route, such as the synchro-downshifting route, in response to receiving the second shift signal. Hence, user-actuation of the first switch commands an upshift according to a synchro-shift route, and user-actuation of the second switch commands a downshift according to a synchro-shift route. The synchro-downshifting route can be the same (but in reverse) as the synchro-upshifting route. Alternatively, the synchro-upshifting route can be different from the synchro-downshifting route.

The controller is further configured to control only one of the first and second gear changing devices to change the transmission ratio of the bicycle transmission in response to receiving the third shift signal, different from the first shift signal, from the first switch. Alternatively, or additionally, the controller is further configured to control only one of the first and second gear changing devices to change the transmission ratio of the bicycle transmission in response to receiving the fourth shift signal, different from the second shift signal, from the second switch. Hence, the user can forego shifting according to the synchro-shift route and specifically command a gearshift of either the first gear changing device or the second gear changing device. So as to not clutter the bicycle cockpit with many inputs, the user can use the same first and second switches for commanding upshifting (with the first shift signal) or downshifting (with the second shift signal) according to a synchro-shift route, and for commanding a gearshift of only one of the first and second gear changing devices (with the third or fourth shift signal).

Optionally, the first shift signal is representative of a first way of switching, such as single switching, of the first switch. The first switch can e.g. be embodied as a first button, lever, rotary switch, or the like. The first user-switch interaction can e.g. be a press of the first button, such as a single press and/or short press.

Optionally, the second shift signal is representative of the first way of switching, such as single switching, of the second switch. The second switch can e.g. be embodied as a second button, lever, rotary switch, or the like. The first user-switch interaction can e.g. be a press of the second button, such as a single press and/or short press.

Optionally, the third signal is representative of a second way of switching, different from the first way of switching of the first switch. The second way of switching can e.g. be a double switching of the first switch or a holding of the first switch for a longer period of time than in the first way of switching.

Optionally, the fourth signal is representative of the second way of switching, different from the first way of switching of the second switch. The second way of switching can e.g. be a double switching of the first switch or a holding of the first switch for a longer period of time than in the first way of switching.

Optionally, the second way is representative of a longer holding of the switch than the first way. Optionally, the controller is configured to determine that the signal is the first shift signal if a time between the first switch being actuated and released is less than a predetermined time interval, and to determine that the signal is the third shift signal if the first switch has not yet been released after the predetermined time interval. Optionally, the controller is configured to determine that the signal is the second shift signal if a time between the second switch being actuated and released is less than a predetermined time interval, and to determine that the signal is the fourth shift signal if the second switch has not yet been released after the predetermined time interval.

Optionally, a smallest gear ratio step size achievable with the first gear changing device is smaller than a smallest gear ratio step size achievable with the second gear changing device. The first gear changing device can e.g. be an electrically actuatable rear derailleur, and the second gear changing device can be an electrically actuatable internal hub transmission or electrically actuatable internal crank transmission. Alternatively, the first gear changing device can e.g. be an electrically actuatable rear derailleur, and the second gear changing device can be an electrically actuatable front derailleur.

Optionally, the first gear changing device and the second gear changing device are included in an electrically actuatable internal hub transmission. Optionally, the first gear changing device and the second gear changing device are included in an electrically actuatable internal crank transmission. Optionally, the first gear changing device is included in an electrically actuatable internal hub transmission, and the second gear changing device is included in an electrically actuatable internal crank transmission. Optionally, the first gear changing device is included in an electrically actuatable internal crank transmission, and the second gear changing device is included in an electrically actuatable internal hub transmission.

Optionally, the controller is configured to control only the second gear changing device to increase the transmission ratio of the bicycle transmission in response to receiving the third (or fourth) shift signal. Alternatively, or additionally, the controller is configured to control only the second gear changing device to decrease the transmission ratio of the bicycle transmission in response to receiving the fourth (or third) shift signal. Especially, when the smallest gear ratio step size achievable with the first gear changing device is smaller than the smallest gear ratio step size achievable with the second gear changing device, specifically commanding a gearshift of only the second gear changing device can be beneficial. Especially when the second gear changing device provides only two selectable transmission ratios, the controller can be configured to control only the second gear changing device to change its transmission ratio in response to receiving the third and/or fourth shift signal. Commanding a downshift of the second gear changing device can decrease the overall transmission gear ratio by more than one step, allowing sudden torque increase (bail out). Commanding an upshift of the second gear changing device can increase the overall transmission gear ratio by more than one step, allowing sudden speed increase.

Optionally, the controller is configured control only the second gear changing device to shift to a next higher transmission ratio of the second gear changing device in response to receiving the third (or fourth) shift signal, and in case the transmission ratio of the second gear changing device is already maximum, control only the first gear changing device to shift to a transmission ratio higher than the next higher transmission ratio of the first gear changing device in response to receiving the third shift signal. Hence, a gear change larger than one step can be commanded to be preferably be performed by the second gear changing device, but to be performed by the first gear changing device in case it cannot be performed by the second gear changing device. Hence, in case the user forgets that the gear change larger than one step with the second gear changing device is not possible, is not confronted with no gear change at all, but rather with the gear change larger than one step albeit performed by the first gear changing device.

Optionally, the controller is configured to control only the second gear changing device to shift to a next lower transmission ratio of the second gear changing device in response to receiving the fourth (or third) shift signal, and in case the transmission ratio of the second gear changing device is already minimum, control only the first gear changing device to shift to a transmission ratio lower than the next lower transmission ratio of the first gear changing device in response to receiving the fourth shift signal.

A second mode comprises in response to receiving the first shift signal controlling only the first gear changing device to change a transmission ratio of the bicycle transmission to a next higher transmission ratio. The second mode comprises in response to receiving the second shift signal controlling only the first gear changing device to change a transmission ratio of the bicycle transmission to a next lower transmission ratio. The second mode comprises in response to receiving the third (or fourth) shift signal controlling only the second gear changing device to change a transmission ratio of the bicycle transmission to a higher transmission ratio. The second mode comprises in response to receiving the fourth (or third) shift signal controlling only the second gear changing device to change a transmission ratio of the bicycle transmission to a lower transmission ratio. Hence, the user can individually control the first gear changing device and the second gear changing device using the first and second switches. So as to not clutter the bicycle cockpit with many switches, the user can use the same first and second switches for commanding upshifting (with the first shift signal) or downshifting (with the second shift signal) of the first gear changing device, and for commanding upshifting (with the third (or fourth) shift signal) or downshifting (with the fourth (or third) shift signal) of the second gear changing device.

It will be appreciated that any one or more of the above aspects, features and options can be combined. It will be appreciated that any one of the options described in view of one of the aspects can be applied equally to any of the other aspects. It will also be clear that all aspects, features and options described in view of the clutch system apply equally to the method, and vice versa.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
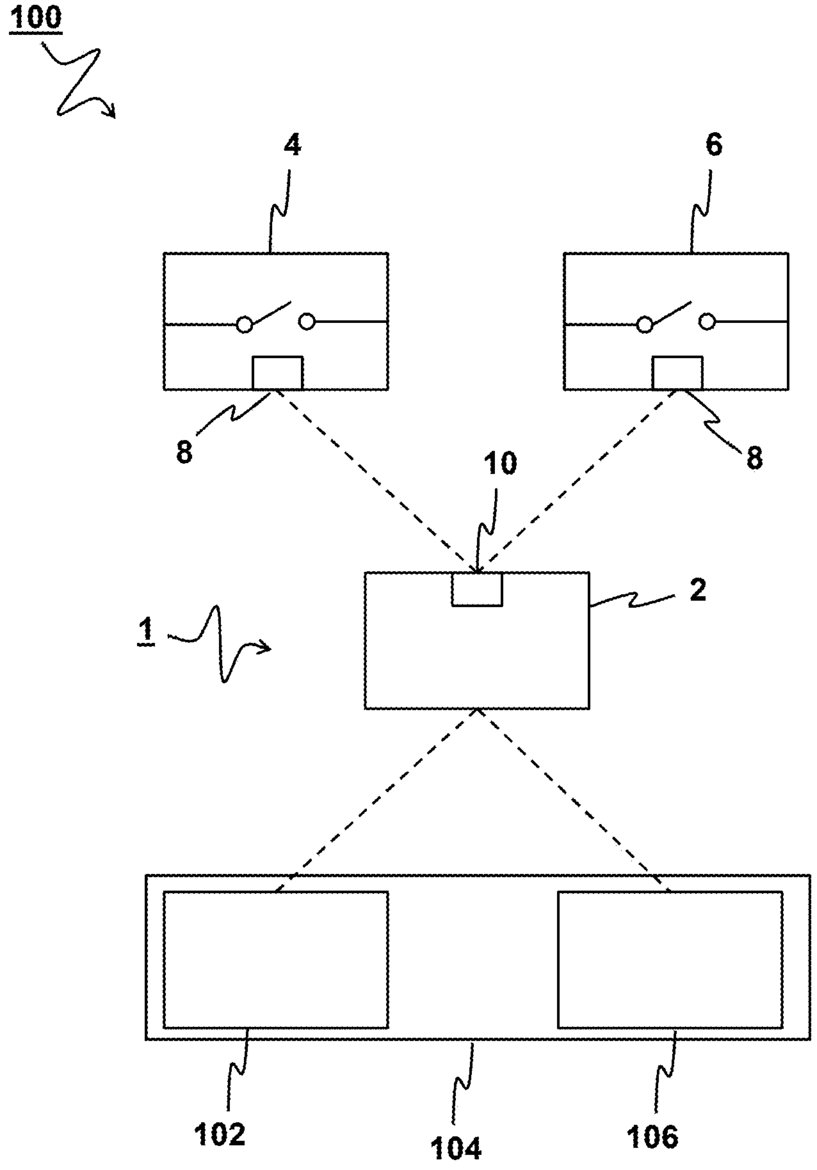
FIG. 1 shows an examples of a bicycle gear changing system.

FIG. 1 shows an example of a bicycle gear changing system 100. The bicycle gear changing system 100 comprises a bicycle gear changing apparatus 1. It will be appreciated that the bicycle gear changing system 100 and apparatus 1 can be used in various vehicles, such as bicycles or other human powered vehicles or light electric vehicles, such as electric vehicles having an electric propulsion motor of 5 kW or less.

In this example, the bicycle gear changing apparatus 1 comprises a controller 2 configured to be operatively coupled to a first electrical switch 4 and a second electrical switch 6. The switches 4,6 can e.g. be wiredly or wirelessly coupled to the controller 2. The switches 4,6 can e.g. have a transmitter(s) 8 associated therewith, the transmitter(s) 8 being in wireless communication with a receiver 10 of the controller 2.

The first and second switches 4, 6 are electrical components that can selectively disconnect or connect a conducting path in an electrical circuit. The switches 4, 6 can be actuated and released. The actuating can e.g. be a depressing of a button, the moving of a lever, the rotating of a rotary button or the like. Herein, the switches 4, 6 is referred to as being in an "on" state, ON, while actuated, and being in an "off" state, OFF, while released. It will be clear that is can depend on the controller 2 and the further circuitry connecting the switches 4, 6 to the controller 2 whether the "on" state is a conducting state of the switch and the "off" state is an open circuit state of the switch, or whether the "on" state is the open circuit state of the switch and the "off" state is the conducting state of the switch. The change from the "off" state to the "on" state is herein also referred to as the actuation flank, AF, and the change from the "on" state to the "off" state is herein also referred to as the release flank RF.

The controller 2 is configured to control a first gear changing device 102 of a bicycle transmission 104 and/or a second gear changing device 106 of the bicycle transmission 104 in response a shift signal received from the first switch 4 and/or a shift signal received from the second switch 6.

In this example, the first gear changing device 102 is an electrically actuatable rear derailleur, and the second gear changing device 106 is an electrically actuatable internal hub transmission or electrically actuatable internal crank transmission. Alternatively, the first gear changing device 102 can e.g. be an electrically actuatable rear derailleur, and the second gear changing device 106 can be an electrically actuatable front derailleur. Alternatively, the first gear changing device 102 and the second gear changing device 106 can both be included in an electrically actuatable internal hub transmission. Alternatively, the first gear changing device 102 and the second gear changing device 106 can both be included in an electrically actuatable internal crank transmission. Alternatively, the first gear changing device 102 can be included in an electrically actuatable internal hub transmission, and the second gear changing device 106 can be included in an electrically actuatable internal crank transmission. Alternatively, the first gear changing device 102 can be included in an electrically actuatable internal crank transmission, and the second gear changing device 106 can be included in an electrically actuatable internal hub transmission. In this example, a smallest gear ratio step size achievable with the first gear changing device 102 is smaller than a smallest gear ratio step size achievable with the second gear changing device 106.

The smallest gear ratio step size achievable with the second gear changing 106 device can e.g. be about 2 or 3 times larger than smallest gear ratio step size achievable with the first gear changing device 102.

The first switch 4 can be triggered by the user in a first way to provide a first shift signal S1. The first shift signal can e.g. be representative of a single closing and/or opening of the first switch (single click). The second switch 6 can be triggered by the user in the first way to provide a second shift signal S2. The second shift signal can e.g. be representative of a single closing and/or opening of the second switch (single click).

The first switch 4 can be triggered by the user in a second way, different from the first way, to provide a third shift signal S3, different from the first shift signal S1. The third shift signal S3 can e.g. be representative of a double closing and/or opening of the first switch (double click). The second switch 6 can be triggered by the user in the second way to provide a fourth shift signal S4, different from the second shift signal S2. The fourth shift signal S4 can e.g. be representative of a double closing and/or opening of the second switch (double click). Alternatively, the third shift signal S3 can e.g. be representative of holding of the first switch 4 for a longer time period (long press) than in the first way (short press). Alternatively, the fourth shift signal S4 can e.g. be representative of holding of the second switch 6 for a longer time period than in the first way (long press).

In this example, the controller 2, in response to receiving the first shift signal S1, controls at least one of the first gear changing device 102 and the second gear changing device 106 to change a transmission ratio of the bicycle transmission 104 to a next higher transmission ratio in accordance with at least one synchro-shift route, such as a synchro-upshifting route. This response to the first shift signal S1 is herein also referred to as a first gear changing action GCA1 for short. Here, the controller 2, in response to receiving the second shift signal S2 controls at least one of the first gear changing device 102 and the second gear changing device 106 to change the transmission ratio of the bicycle transmission 104 to a next lower transmission ratio in accordance with at least one synchro-shift route, such as a synchro-downshifting route. This response to the second shift signal S2 is herein also referred to as a second gear changing action GCA2 for short. Hence, user-actuation of the first switch 4 in the first way can command an upshift according to a synchro-shift route, and user-actuation of the second switch 6 in the first way commands a downshift according to a synchro-shift route. The synchro-downshifting route can be the same (but in reverse) as the synchro-upshifting route. Alternatively, the synchro-upshifting route can be different from the synchro-downshifting route.

In this example, the controller 2, in response to receiving the third shift signal S3, controls only one of the first and second gear changing devices 102, 106. This response to the third shift signal S3 is herein also referred to as a third gear changing action GCA3 for short. Alternatively, or additionally, the controller 2, in response to receiving the fourth shift signal S4, controls only one of the first and second gear changing devices 102, 106. This response to the fourth shift signal S4 is herein also referred to as a fourth gear changing action GCA4 for short. Hence, the user can forego shifting according to the synchro-shift route and specifically command a gearshift of either the first gear changing device 102 or the second gear changing device 106. So as to not clutter the bicycle cockpit with many switches, the user can use the same first and second switches 4, 6 for commanding upshifting (with the first shift signal S1) or downshifting (with the second shift signal S2) according to a synchro-shift route, and for commanding a gearshift of only one of the first and second gear changing devices 102, 106 (with the third or fourth shift signal S3, S4).

In an example, the controller 2, in response to receiving the third shift signal S3, controls only the second gear changing devices 106 to change the transmission ratio associated with the second gear changing device 106 to a next higher transmission ratio, and the controller 2, in response to receiving the fourth shift signal S4, controls only the second gear changing device 106 to change the transmission ratio associated with the second gear changing device 106 to a next lower transmission ratio. Hence, actuating the first and second switches 4, 6 in the second way can cause the controlling of only the second gear changing device 106.

Figure 2A:
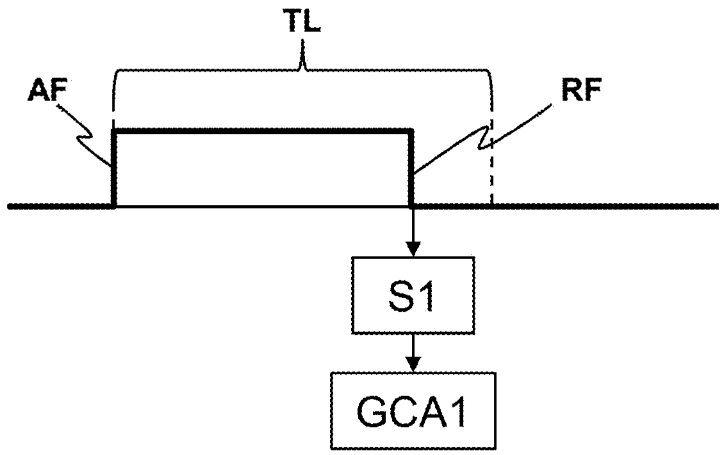
FIGS. 2A, 2B and 2C schematically illustrate a method of controlling.
Figure 2B:
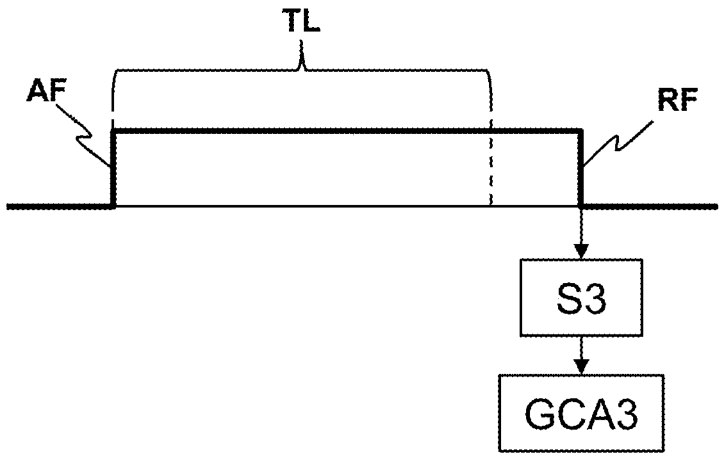
Figure 2C:
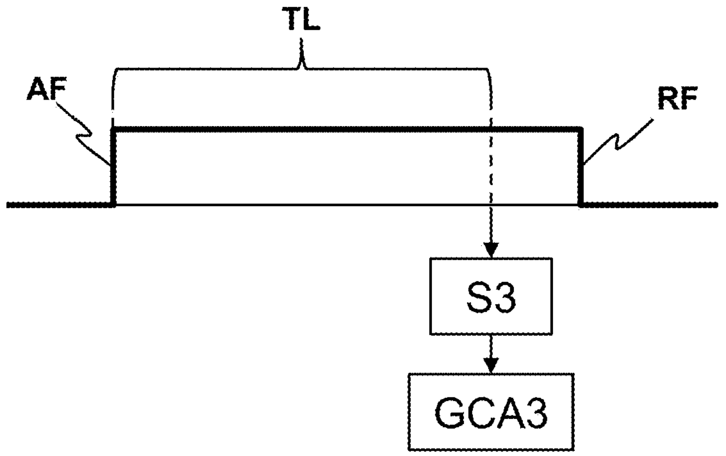

FIGS. 2A, 2B and 2C schematically illustrate a first way of the controller 2 responding to the first switch 4 depending on the switch being actuated for a short period or long period. Upon actuation of the first switch 4, the controller 2 receives the actuation flank AF. In response to receiving the actuation flank AF. Upon release of the first switch 4, the controller 2 receives the release flank RF. The controller 2 then determines the elapsed time between receiving the actuation flank AF and the release flank RF associated with the same switch actuation. Thereto, the controller may e.g. start a timer 8 upon receiving the actuation flank AF and stop the timer 8 upon receiving the release flank RF. Next, the controller 2 compares the determined elapsed time with a predetermined threshold TL. The threshold TL in this example is representative of a minimum time duration to be associated with a long actuation of the switch 4. The threshold TL can e.g. be in the interval of 0.3-7 seconds. However, other values may be used. It will be appreciated that the value of the threshold TL may be user-selectable, e.g. via a user interface of the controller 2, or via a wireless communications device (e.g. via an app), such as a smartphone, in communication with the controller 2. In the example of FIG. 2A, the controller determines that the elapsed time is less than the predetermined threshold TL, and based thereon determines that the switch actuation was representative of a short actuation, and determines that the signal is the first shift signal S1. In response to the first shift signal S1, the controller 2 starts the controlling the first gear changing action GCA1 as prescribed in response to receiving the first shift signal. In FIG. 2B, the controller 2 determines that the elapsed time is more than the predetermined threshold TL, and based thereon determines that the switch actuation was representative of a long actuation, and determines that the signal is the third shift signal S3. In response to the third shift signal, the controller 2 starts the controlling the third gear changing action GCA3 as prescribed in response to receiving the third shift signal. FIG. 2C shows an alternative to the action performed in FIG. 2B. In FIG. 2C, the controller 2 determines that the time elapsed since receiving the actuation flank AF is equal to the predetermined threshold TL but the release flank RF has not yet been received. Based thereon, the controller 2 determines that the switch actuation was representative of a long actuation, and determines that the signal is the third shift signal S3, and starts the controlling the third gear changing action GCA3 as prescribed in response to receiving the third shift signal S3.

Figure 3A:
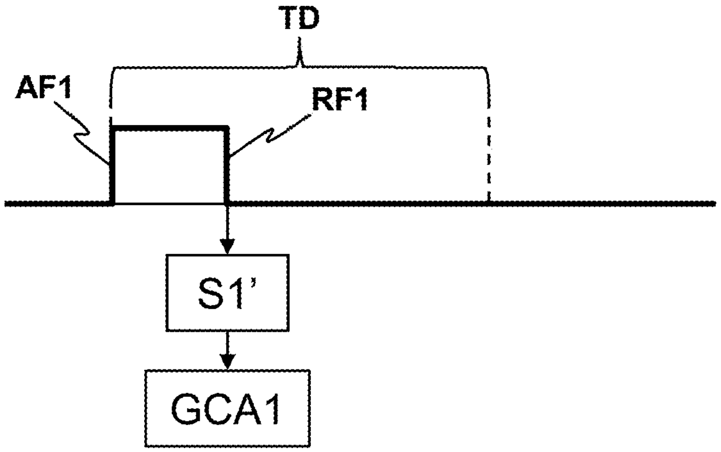
FIGS. 3A and 3B schematically illustrate a method of controlling.
Figure 3B:
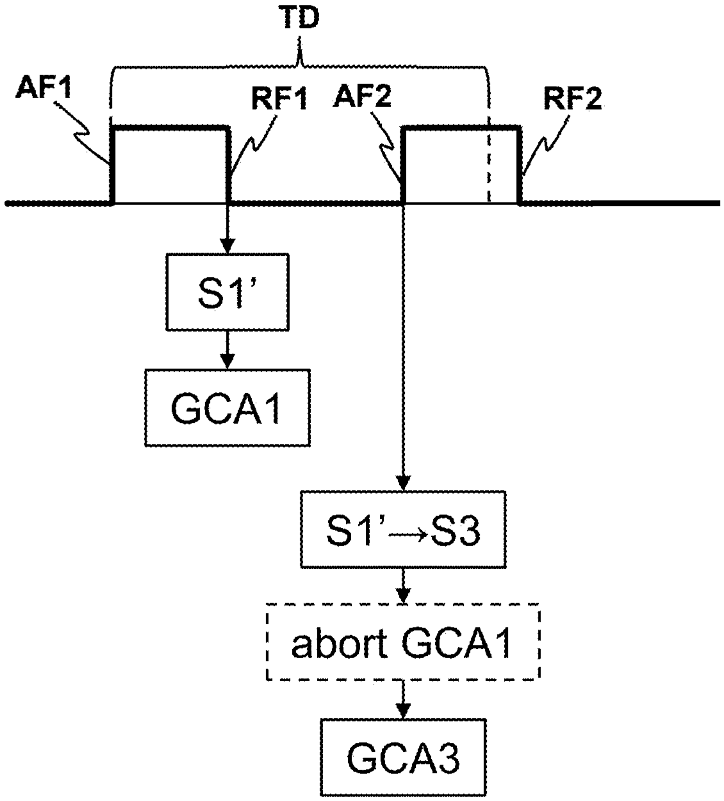

FIGS. 3A and 3B schematically illustrate a second way of the controller 2 responding to the first switch 4 depending on the switch being actuated a single time or more than one times. Upon receiving the release flank RF1 associated with a first actuation of the switch 4 after receiving the first actuation flank AF1, the controller 2 provisionally determines that the signal is the first shift signal S1', and starts the controlling the first gear changing action GCA1 as prescribed in response to receiving the provisional first shift signal S1'. It will be appreciated that at this time it is not certain yet that the signal is indeed a first signal S1. The release flank RF1 can mark a single click, but can also be part of a first click of a double click. By already starting controlling the first gear changing action GCA1 in response to receiving the provisionally determined first shift signal S1', a fast response to the user actuation of the first switch 4 is possible. In the example of FIG. 3A, no second actuation of the switch follows. Hence, the provisional first shift signal S1' turns out to be the first shift signal S1.

In the example of FIG. 3B, a second actuation of the switch 4 follows. Hence, the controller 2 determines that a second actuation flank AF2 is detected within a predetermined time frame TD for a double click after the first actuation flank AF1 or first release flank RF1. The time frame TD can e.g. be in the interval of 0.2-3 seconds. However, other values may be used. It will be appreciated that the value of the time frame TD may be user-selectable, e.g. via a user interface of the controller 2, or via a wireless communications device (e.g. via an app), such as a smartphone, in communication with the controller 2. In response to receiving the second actuation flank AF2, the controller 2 determines that the provisional determination that the signal was the first shift signal S1' is false, and changes the determination to that the signal is the third shift signal S3. In response, the controller 2 can optionally abort the first gear changing action GCA1 already started in response to the provisional first shift signal S1'. The controller 2 starts controlling the third gear changing action GCA3 as prescribed in response to receiving the third shift signal S3.

Figure 4A:
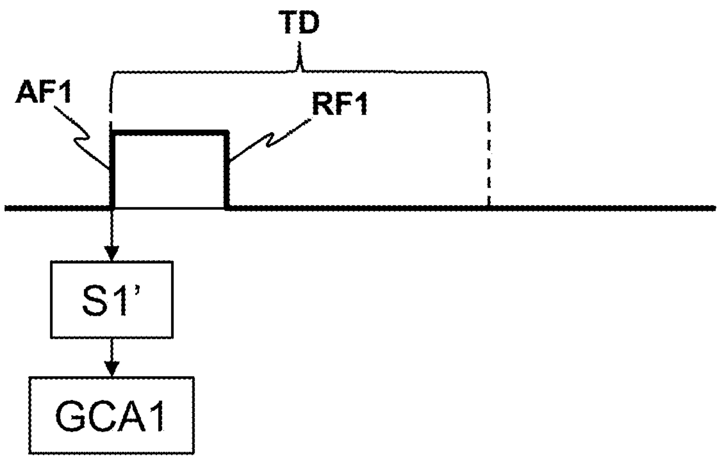
FIGS. 4A and 4B schematically illustrate a method of controlling.
Figure 4B:
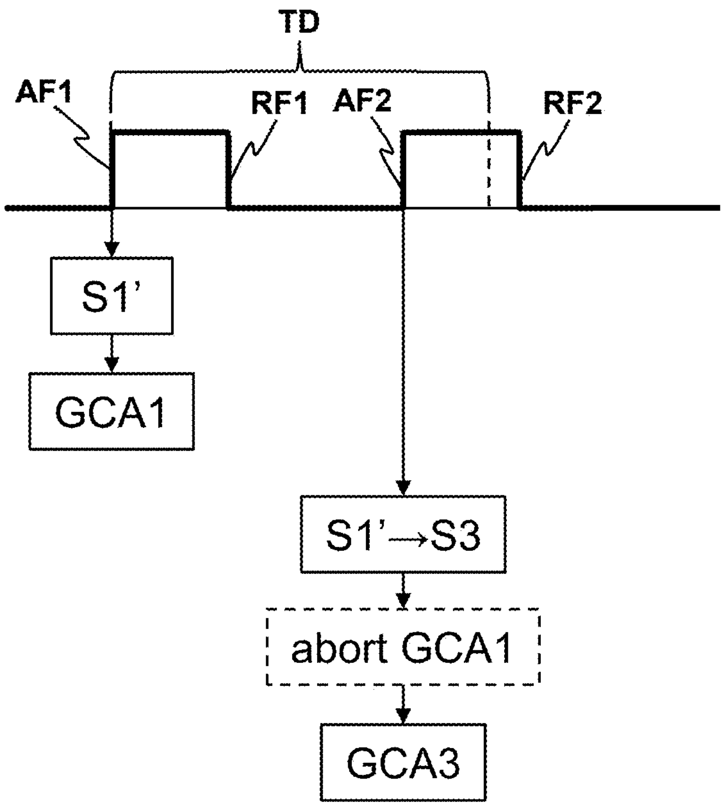

FIGS. 4A and 4B schematically illustrate a third way of the controller 2 responding to the first switch 4 depending on the switch being actuated a single time or more than one times. Upon receiving the actuation flank AF1 associated with a first actuation of the switch 4, the controller 2 provisionally determines that the signal is the first shift signal S1', and starts the controlling the first gear changing action GCA1 as prescribed in response to receiving the provisional first shift signal S1'. It will be appreciated that at this time it is not certain yet that the signal is indeed a first signal S1. In the example of FIG. 4A, no second actuation of the switch follows. Hence, the provisional first shift signal S1' turns out to be the first shift signal S1. In the example of FIG. 4B, a second actuation of the switch 4 follows. Hence, the controller 2 determines that a second actuation flank AF2 is detected within a predetermined time frame TD for a double click after the first actuation flank AF1 or first release flank RF1. In response to receiving the second actuation flank AF2, the controller 2 determines that the provisional determination that the signal was the first shift signal S1' is false, and changes the determination to that the signal is the third shift signal S3. In response, the controller 2 can optionally abort the first gear changing action GCA1 already started in response to the provisional first shift signal S1'. The controller 2 starts controlling the third gear changing action GCA3 as prescribed in response to receiving the third shift signal S3.

Figure 5A:
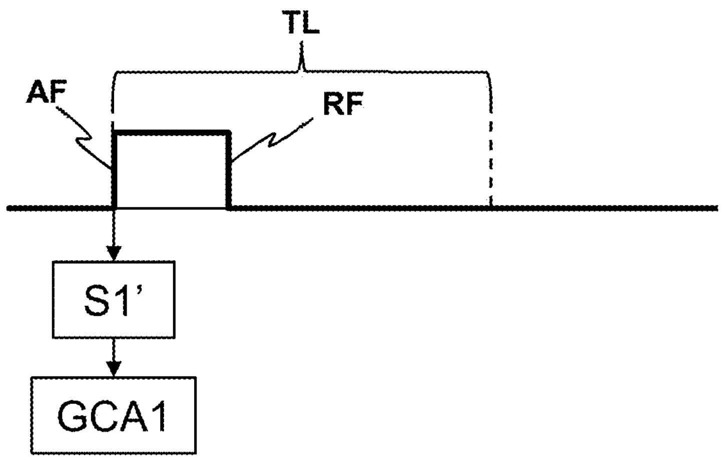
FIGS. 5A and 5B schematically illustrate a method of controlling.
Figure 5B:
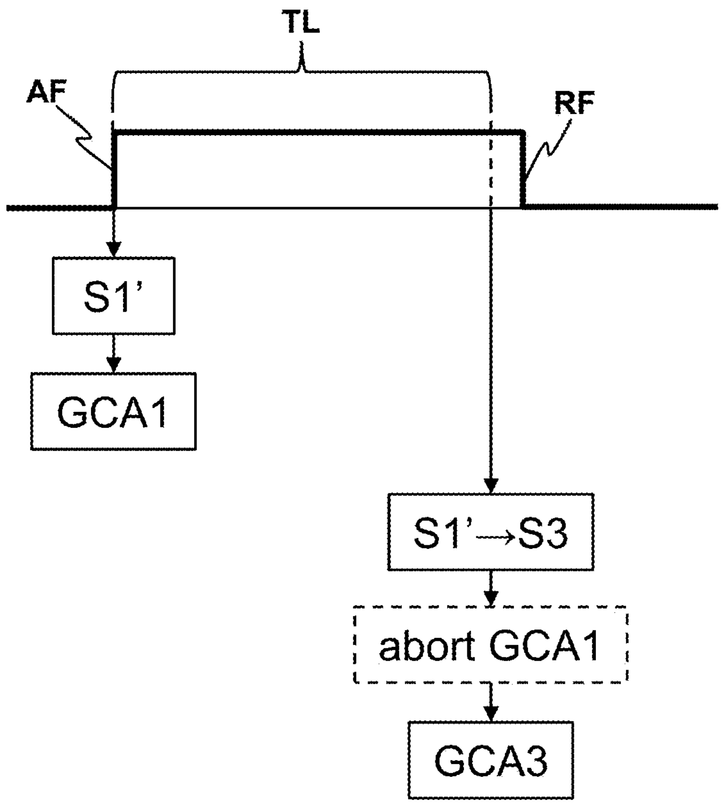

FIGS. 4A and 4B schematically illustrate a third way of the controller 2 responding to the first switch 4 depending on the switch being actuated for a short period or long period. Upon receiving the actuation flank AF associated with actuation of the switch 4, the controller 2 provisionally determines that the signal is the first shift signal S1', and starts the controlling the first gear changing action GCA1 as prescribed in response to receiving the provisional first shift signal S1'. It will be appreciated that at this time it is not certain yet that the signal is indeed a first signal S1 as it is not yet known whether the switch 4 is actuated for a long time or a short time. In the example of FIG. 5A, in response to receiving the release flank RF, the controller 2 determines that the elapsed time is less than the predetermined threshold TL, and based thereon determines that the switch actuation was representative of a short actuation. Hence, the provisional first shift signal S1' turns out to be the first shift signal S1. In the example of FIG. 5B, the controller 2 determines when the elapsed time is equal to the threshold TL no release flank RF has yet been received. Based thereon, the controller 2 determines that the switch actuation was representative of a long actuation. Thus, the controller 2 determines that the provisional determination that the signal was the first shift signal S1' is false, and changes the determination to that the signal is the third shift signal S3. In response, the controller 2 can optionally abort the first gear changing action GCA1 already started in response to the provisional first shift signal S1'. The controller 2 starts controlling the third gear changing action GCA3 as prescribed in response to receiving the third shift signal S3. It will be appreciated that the controller 2 can also determine that the switch actuation was representative of a long actuation upon receiving the release flank RF as in FIG. 2B.

It has been found that especially if the first gear changing action GCA1 relates to controlling an electrically actuatable rear derailleur or electrically actuatable front derailleur, the determination that the provisional determination was false can be performed fast enough to abort the changing of the transmission ratio of the bicycle transmission with the derailleur, and perform the third gear changing action GCA3 instead. It will be appreciated that the controller 2 can be configured to determine not to abort the first gear changing action GCA1. The controller 2 can e.g. determine not to abort the first gear changing action GCA1 if the first gear changing action GCA1 has already progressed too far to be aborted without providing acceptable driving experience to the user. Also when the first gear changing action GCA1 is not aborted, the third gear changing action GCA3 can be performed in response to the changed determination that the signal is the third shift signal S3.

Although the FIGS. 2A-5B have been described in view of the first switch 4, the first shift signal S1, the first gear changing action GCA1, the third shift signal S3, and the third gear changing action GCA3, it will be appreciated that the same will apply, mutatis mutandis, to the second switch 6, the second shift signal S2, the second gear changing action GCA2, the fourth shift signal S4, and the fourth gear changing action GCA4.

Returning to FIG. 1, the controller 2 in this example is configured to control only the second gear changing device 106 to increase the transmission ratio of the bicycle transmission in response to receiving the third (or fourth) shift signal, and the controller 2 is configured to control only the second gear changing device 106 to decrease the transmission ratio of the bicycle transmission in response to receiving the fourth (or third) shift signal. Optionally, in case the transmission ratio of the second gear changing device 106 is already maximum, the controller can control only the first gear changing device 102 to shift to a transmission ratio higher than the next higher transmission ratio of the first gear changing device in response to receiving the third (or fourth) shift signal. Hence, a gear change larger than one step can be commanded to be preferably be performed by the second gear changing device, but to be performed by the first gear changing device in case it cannot be performed by the second gear changing device. Hence, in case the user forgets that the gear change larger than one step with the second gear changing device is not possible, is not confronted with no gear change at all, but rather with the gear change larger than one step albeit performed by the first gear changing device. Similarly, in case the transmission ratio of the second gear changing device is already minimum, the controller 2 can control only the first gear changing device 102 to shift to a transmission ratio lower than the next lower transmission ratio of the first gear changing device in response to receiving the fourth (or third) shift signal.

The bicycle gear changing system 100 and/or the bicycle gear changing apparatus 1 of FIG. 1 can be configured to be used in different operating modes. In a second mode the controller 2 can, in response to receiving the first shift signal S1, control only the first gear changing device 102 to change a transmission ratio of the bicycle transmission 104 to a next higher transmission ratio, and, in response to receiving the second shift signal S2, control only the first gear changing device 102 to change a transmission ratio of the bicycle transmission 104 to a next lower transmission ratio. In the second mode, the controller 2 can, in response to receiving the third (or fourth) shift signal, controlling only the second gear changing device 106 to change a transmission ratio of the bicycle transmission to a higher transmission ratio, and, in response to receiving the fourth (or third) shift signal, control only the second gear changing device 106 to change a transmission ratio of the bicycle transmission 104 to a lower transmission ratio. Hence, the user can individually control the first gear changing device 102 and the second gear changing device 106 using the first and second switches 4, 6.

Figure 6:
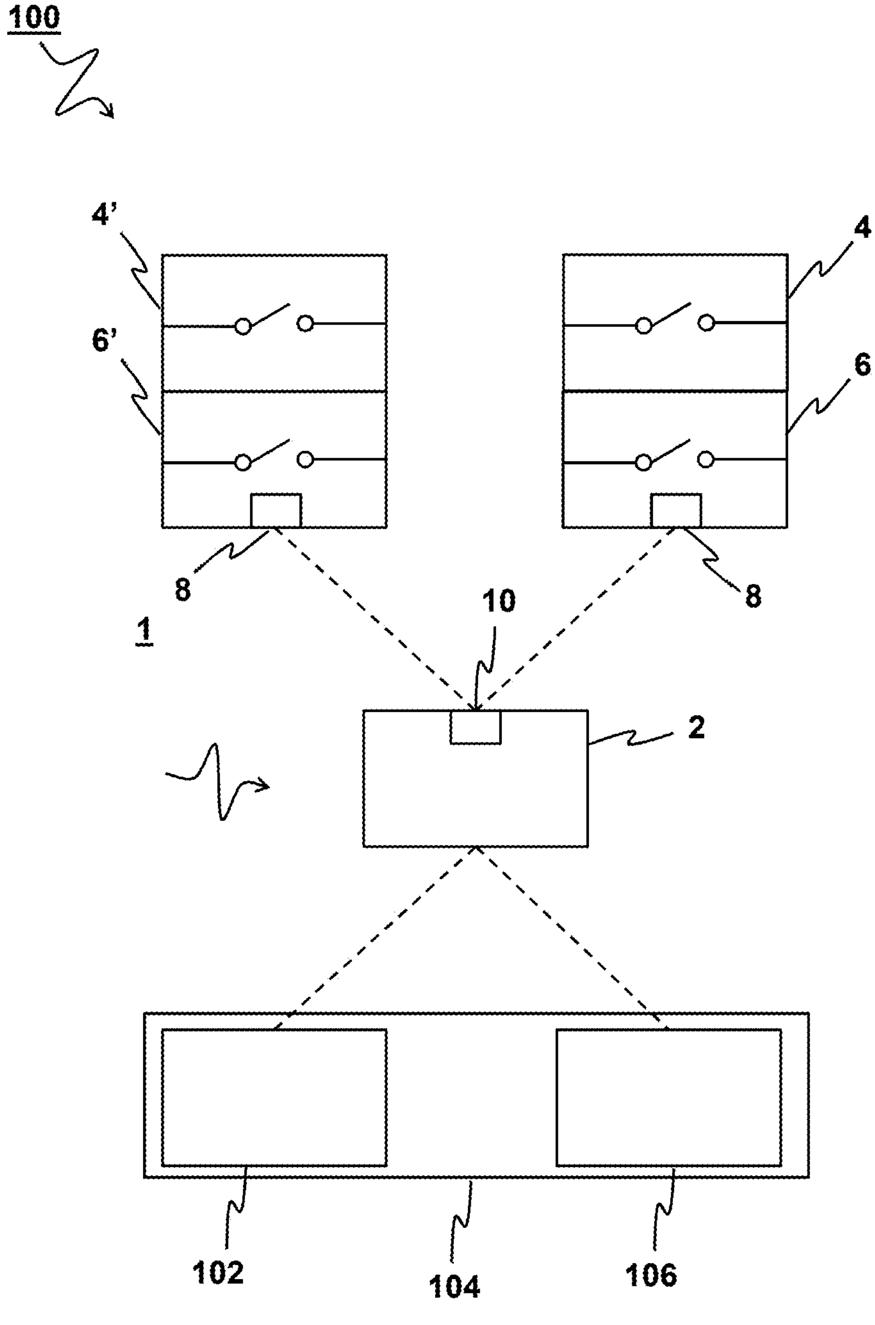
FIG. 6 shows an examples of a bicycle gear changing system.

FIG. 6 shows an example of a bicycle gear changing system 100 and bicycle gear changing apparatus 1, similar to the system and apparatus shown in FIG. 1. In this example, the system comprises the first switch 4 and the second switch 6, and in addition a third switch 4' and a fourth switch 6'. In this example, the first and second switches 4, 6 are configured to be placed at or near a right hand gripping portion of a bicycle handlebar, and the third and fourth switches 4', 6' are configured to be placed at or near a left hand gripping portion of a bicycle handlebar, or vice versa. The first and second switches 4, 6 can be placed in a first housing. The third and fourth switches 4', 6' can be placed in a second housing. The third switch 4' can be triggered by the user in the first way to provide a fifth shift signal S1', similar to the first shift signal S1. The fourth switch 6' can be triggered by the user in the first way to provide a sixth shift signal S2', similar to the second shift signal S2. The third switch 4' can be triggered by the user in the second way to provide a seventh shift signal S3', similar to the third shift signal S3. The fourth switch 6' can be triggered by the user in the second way to provide an eighth shift signal S4', similar to the fourth shift signal S4. The bicycle gear changing system 100 and/or the bicycle gear changing apparatus 1 of FIG. 6 can be configured to be used in different operating modes.

In a first mode, the third and fourth switches 4', 6' perform the same functions as the first and second switches 4, 6, e.g. as described in view of FIGS. 1-5B. Hence, the user can control the system 100 at will with the left hand or right hand.

In a second mode, the third and fourth switches 4', 6' perform different functions as the first and second switches 4, 6.

For example, the first shift signal controls a single step upshift according to a synchroshift path; the second shift signal controls a single step downshift according to a synchroshift path; the third shift signal controls a single step upshift of the first gear changing device only; the fourth shift signal controls a single step downshift of the first gear changing device only; the fifth shift signal controls a two-step (i.e. tow gear ratio steps) upshift according to a synchroshift path; the sixth shift signal controls a two-step downshift according to a synchroshift path; the seventh shift signal controls a single step upshift of the second gear changing device only; and/or the eighth shift signal controls a single step downshift of the second gear changing device only.

Figure 7:
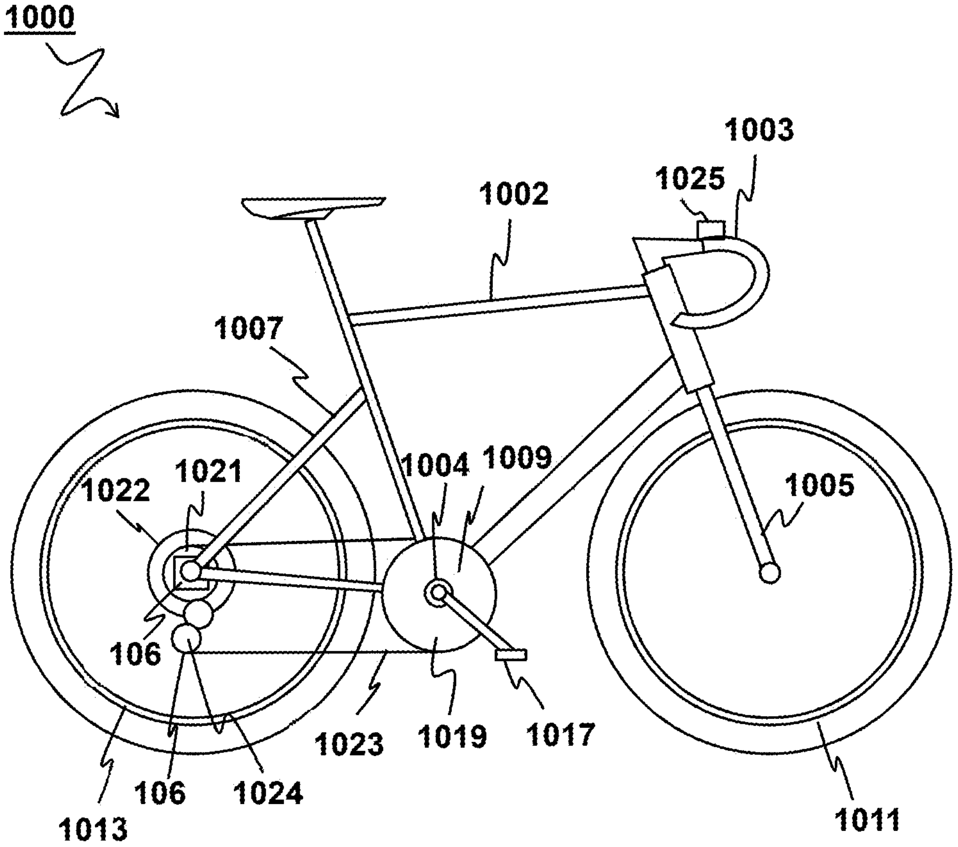
FIG. 7 shows a bicycle.

FIG. 7 shows a bicycle 1000. The bicycle 1000 comprises a frame 1002 with a front fork 1005 and a rear fork 1007, as well as a front wheel and a rear wheel 1011, 1013 located in the front and rear fork respectively. The bicycle 1000 further comprises a crank 1017, and a front chain wheel 1019. The bicycle 1000 comprises a transmission system 104. In this example, the transmission system comprises as a hub transmission 1022 as the second gear changing device 106. The bicycle 1000 also comprises a plurality of sprockets 2021, wherein a chain 1023 threads over the front chain wheel 1019 and one of the sprockets 2021. The bicycle 1000 further comprises a rear derailleur 1024 as the first gear changing device 102. The bicycle comprises a handlebar 1003. In this example, a user interface 1025, such as comprising the switches 4, 6, 4', 6' is mounted to the handlebar 1003.

Now follow numbered embodiments providing a concise description of some of the embodiments as disclosed in the preceding description.

Embodiment 1. A bicycle gear changing apparatus comprising:

- a controller configured to be operatively coupled to a first switch to receive a first shift signal, and operatively coupled to a second switch to receive a second shift signal;
- the controller being configured to:
  - control at least one of a first gear changing device of a bicycle transmission and a second gear changing device of the bicycle transmission to change a transmission ratio of the bicycle transmission to a next higher transmission ratio in accordance with at least one synchro-shift route in response to receiving the first shift signal; and to
  - control at least one of the first gear changing device of the bicycle transmission and the second gear changing device of the bicycle transmission to change the transmission ratio of the bicycle transmission to a next lower transmission ratio in accordance with at least one synchro-shift route in response to receiving the second shift signal;
- the controller further configured to:
  - control only one of the first and second gear changing devices to change the transmission ratio of the bicycle transmission in response to receiving a third shift signal, different from the first shift signal, from the first switch or in response to receiving a fourth shift signal, different from the second shift signal, from the second switch.

Embodiment 2. The bicycle gear changing apparatus of embodiment 1, wherein the first shift signal is representative of a first way of triggering, such as single switching, of the first switch; and wherein the second shift signal is representative of the first way of triggering, such as single switching, of the second switch.

Embodiment 3. The bicycle gear changing apparatus of embodiment 2, wherein the third signal is representative of a second way of triggering, different from the first way of triggering, such as a double switching or long hold, of the first switch. Embodiment 4. The bicycle gear changing apparatus of embodiment 2 or 3, wherein the fourth signal is representative of a second way of switching, different from the first way of switching, such as a double switching or long hold, of the second switch.

Embodiment 5. The bicycle gear changing device of embodiment 3 or 4, wherein the second way is representative of a longer holding of the switch than the first way.

Embodiment 6. The bicycle gear changing device of embodiment 5, wherein the controller is configured to determine that the signal is the first shift signal if a time between the first switch being actuated and released is less than a predetermined time interval, and to determine that the signal is the third shift signal if the first switch has not yet been released after the predetermined time interval.

Embodiment 7. The bicycle gear changing device of embodiment 5, wherein the controller is configured to determine that the signal is the second shift signal if a time between the second switch being actuated and released is less than a predetermined time interval, and to determine that the signal is the fourth shift signal if the second switch has not yet been released after the predetermined time interval.

Embodiment 8. The bicycle gear changing apparatus of embodiment 3, wherein the first shift signal is representative of a first switching duration of the first switch and the third shift signal representative of a second, longer, switching duration of the first switch, the controller being configured to,

- upon actuation of the first switch, provisionally determine that the signal is the first shift signal, and start the controlling at least one of the first and second gear changing devices associated with the first shift signal, and to,
- upon determining that the actuation of the switch is actually representative of the second switching duration, change the determination to that the signal is the third shift signal, abort the controlling at least one of the first and second gear changing devices associated with the first shift signal, and start the controlling only one of the first and second gear changing devices associated with the third shift signal.

Embodiment 9. The bicycle gear changing apparatus of embodiment 4, wherein the second shift signal is representative of a first switching duration of the second switch and the fourth shift signal representative of a second, longer, switching duration of the second switch, the controller being configured to,

- upon actuation of the second switch, provisionally determine that the signal is the second shift signal, and start the controlling at least one of the first and second gear changing devices associated with the second shift signal, and to,
- upon determining that the actuation of the second switch is actually representative of the second switching duration, change the determination to that the signal is the fourth shift signal, abort the controlling at least one of the first and second gear changing devices associated with the second shift signal, and start the controlling only one of the first and second gear changing devices associated with the fourth shift signal.

Embodiment 10. The bicycle gear changing apparatus of embodiment 8 or 9, wherein the second switching duration is representative of the switch being actuated more than once.

Embodiment 11. The bicycle gear changing device of embodiment 3 or 4, wherein the first way is representative of a single switching of the switch, and the second way is representative of a double switching of the switch.

Embodiment 12. The bicycle gear changing apparatus of any of embodiments 1-11, wherein a smallest gear ratio step size achievable with the first gear changing device is smaller than a smallest gear ratio step size achievable with the second gear changing device.

Embodiment 13. The bicycle gear changing apparatus of any of embodiments 1-12, wherein the controller is configured to control only the second gear changing device to change its transmission ratio in response to receiving the third and/or fourth shift signal.

Embodiment 14. The bicycle gear changing apparatus of any of embodiments 1-13, wherein the controller is configured to control only the second gear changing device to increase the transmission ratio of the bicycle transmission in response to receiving the third, or fourth, shift signal.

Embodiment 15. The bicycle gear changing apparatus of any of embodiments 1-14, wherein the controller is configured to control only the second gear changing device to decrease the transmission ratio of the bicycle transmission in response to receiving the fourth, or third, shift signal.

Embodiment 16. The bicycle gear changing apparatus of any of embodiments 1-13, wherein the controller is configured to control only the second gear changing device to shift to a next higher transmission ratio of the second gear changing device in response to receiving the third shift signal, and in case the transmission ratio of the second gear changing device is already maximum, control only the first gear changing device to shift to a transmission ratio higher than the next higher transmission ratio of the first gear changing device in response to receiving the third shift signal.

Embodiment 17. The bicycle gear changing apparatus of any of embodiments 1-15, wherein the controller is configured to control only the second gear changing device to shift to a next lower transmission ratio of the second gear changing device in response to receiving the fourth shift signal, and in case the transmission ratio of the second gear changing device is already minimum, control only the first gear changing device to shift to a transmission ratio lower than the next lower transmission ratio of the first gear changing device in response to receiving the fourth shift signal.

Embodiment 18. The bicycle gear changing apparatus of any of embodiments 1-17, wherein the first gear changing device is an electrically actuatable rear derailleur, and the second gear changing device is an electrically actuatable internal hub transmission or electrically actuatable internal crank transmission.

Embodiment 19. The bicycle gear changing apparatus of any of embodiments 1-18, wherein the at least one synchro-shifting route includes at least one synchro-upshifting route and at least one synchro-downshifting route, the controller being further configured to control at least one of the first and second gear changing devices in accordance with the synchro-upshifting route in response to receiving the first shift signal, and to control at least one of the first and second gear changing devices in accordance with the synchro-downshifting route in response to receiving the second shift signal.

Embodiment 20. The bicycle gear changing apparatus according to embodiment 19, wherein the controller is further configured to set at least one synchro-upshift point and at least one synchro-downshift point to provide two distinct synchro-shift routes.

Embodiment 21. A bicycle gear changing apparatus comprising:

- a controller configured to be operatively coupled to a first switch to receive a first shift signal, and operatively coupled to a second switch to receive a second shift signal;
- the controller being configured to:
  - control only a first gear changing device of a bicycle transmission to increase a transmission ratio of the bicycle transmission in response to receiving the first shift signal;
  - control only the first gear changing device of a the bicycle transmission to decrease the transmission ratio of the bicycle transmission in response to receiving the second shift signal;
  - control only the second gear changing device to change the transmission ratio of the bicycle transmission in response to receiving a third shift signal, different from the first shift signal, from the first switch or in response to receiving a fourth shift signal, different from the second shift signal, from the second switch.

Embodiment 22. The bicycle gear changing apparatus of embodiment 21, wherein the first shift signal is representative of a first way of triggering, such as single switching, of the first switch; and wherein the second shift signal is representative of the first way of triggering, such as single switching, of the second switch.

Embodiment 23. The bicycle gear changing apparatus of embodiment 22, wherein the third signal is representative of a second way of triggering, different from the first way of triggering, such as a double switching or long hold, of the first switch.

Embodiment 24. The bicycle gear changing apparatus of embodiment 22 or 23, wherein the fourth signal is representative of a second way of switching, different from the first way of switching, such as a double switching or long hold, of the second switch.

Embodiment 25. The bicycle gear changing apparatus of any of embodiments 21-24, wherein a smallest gear ratio step size achievable with the first gear changing device is smaller than a smallest gear ratio step size achievable with the second gear changing device.

Embodiment 26. The bicycle gear changing apparatus of embodiment 25, wherein the controller is configured to control only the second gear changing device to change its transmission ratio in response to receiving the third and/or fourth shift signal.

Embodiment 27. The bicycle gear changing apparatus of embodiment 25 or 26, wherein the controller is configured to control only the second gear changing device to increase the transmission ratio of the bicycle transmission in response to receiving the third, or fourth, shift signal.

Embodiment 28. The bicycle gear changing apparatus of embodiment 25, 26 or 27, wherein the controller is configured to control only the second gear changing device to decrease the transmission ratio of the bicycle transmission in response to receiving the fourth, or third, shift signal.

Embodiment 29. The bicycle gear changing apparatus of embodiment 27, wherein the controller is configured to control only the second gear changing device to shift to a next higher transmission ratio of the second gear changing device in response to receiving the third shift signal, and in case the transmission ratio of the second gear changing device is already maximum, control only the first gear changing device to shift to a transmission ratio higher than the next higher transmission ratio of the first gear changing device in response to receiving the third shift signal.

Embodiment 30. The bicycle gear changing apparatus of embodiment 28, wherein the controller is configured to control only the second gear changing device to shift to a next lower transmission ratio of the second gear changing device in response to receiving the fourth shift signal, and in case the transmission ratio of the second gear changing device is already minimum, control only the first gear changing device to shift to a transmission ratio lower than the next lower transmission ratio of the first gear changing device in response to receiving the fourth shift signal.

Embodiment 31. The bicycle gear changing apparatus of any of embodiments 21-30, wherein the first gear changing device is an electrically actuatable rear derailleur, and the second gear changing device is an electrically actuatable internal hub transmission or electrically actuatable internal crank transmission.

Embodiment 32. The bicycle gear changing apparatus of any of embodiments 1-30, wherein: the first gear changing device and the second gear changing device are included in an electrically actuatable internal hub transmission; the first gear changing device and the second gear changing device are included in an electrically actuatable internal crank transmission; the first gear changing device is included in an electrically actuatable internal hub transmission, and the second gear changing device is included in an electrically actuatable internal crank transmission; or the first gear changing device is included in an electrically actuatable internal crank transmission, and the second gear changing device is included in an electrically actuatable internal hub transmission Embodiment 33. A bicycle gear changing apparatus comprising:

- a controller configured to be operatively coupled to a first switch to receive a first shift signal representative of a first switching duration of the first switch and to receive a third shift signal representative of a second, longer, switching duration of the first switch, the controller being configured to:
  - control a first gear changing action in response to receiving the first shift signal; and to
  - control a third gear changing action in response to receiving the third shift signal.

Embodiment 34. The bicycle gear changing apparatus of embodiment 33, wherein the controller is configured to, upon actuation of the first switch, provisionally determine that the signal is the first shift signal, and to, upon determining that the actuation of the switch is actually representative of the second switching duration, change the determination to that the signal is the third shift signal.

Embodiment 35. The bicycle gear changing apparatus of embodiment 33 or 34, wherein the first shift signal is representative of a short actuation of the switch, and the third shift signal is representative of a long actuation of the switch.

Embodiment 36. The bicycle gear changing apparatus of embodiment 33, 34 or 35, wherein the first shift signal is representative of a single closing and/or opening of the first switch and the third shift signal is representative of a double closing and/or opening of the first switch.

Embodiment 37. The bicycle gear changing apparatus of embodiment 25, wherein the controller is configured to, upon actuation of the first switch, provisionally determine that the signal is the first shift signal, and to, upon determining that the actuation of the switch is actually representative of the double closing and/or opening of the first switch, change the determination to that the signal is the third shift signal.

Embodiment 38. The bicycle gear changing apparatus of any of embodiments 34-37, wherein the controller is configured to start the first gear changing action in response to the provisional determination that the signal is the first shift signal, and in response to the changed determination that the signal is the third shift signal, abort the first gear changing action and starting the third gear changing action.

Embodiment 39. The bicycle gear changing apparatus of any of embodiments 33-38, wherein the first gear changing action is controlling at least one of a first gear changing device of a bicycle transmission and a second gear changing device of a bicycle transmission to change the transmission ratio of the bicycle transmission in accordance with at least one synchro-shift route; and the third gear changing action is controlling only one of the first and second gear changing devices to change the transmission ratio of the bicycle transmission.

Embodiment 40. The bicycle gear changing apparatus of any of embodiments 33-39, wherein the first gear changing action is controlling only the first gear changing device of a bicycle transmission to change the transmission ratio of the bicycle transmission; and the third gear changing action is control only the second gear changing device to change the transmission ratio of the bicycle transmission.

Embodiment 41. The bicycle gear changing apparatus of any of embodiments 33-40, wherein a smallest gear ratio step size achievable with the first gear changing device is smaller than a smallest gear ratio step size achievable with the second gear changing device.

Embodiment 42. A bicycle gear changing system comprising:

- the bicycle gear changing apparatus of any of embodiments 1-41;
- the first and second switches; and
- the first and second gear changing devices.

Embodiment 43. A human powered or light electric vehicle, such as a bicycle, comprising the bicycle gear changing apparatus of any of embodiments 1-41, or the bicycle gear changing system of embodiment 42.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A bicycle gear changing apparatus comprising:

a controller configured to be operatively coupled to a first switch to receive a first shift signal, and operatively coupled to a second switch to receive a second shift signal;

the controller being configured to:

control at least one of a first gear changing device of a bicycle transmission and a second gear changing device of the bicycle transmission to change a transmission ratio of the bicycle transmission to a next higher transmission ratio in accordance with at least one synchro-shift route in response to receiving the first shift signal; and to control at least one of the first gear changing device of the bicycle transmission and the second gear changing device of the bicycle transmission to change the transmission ratio of the bicycle transmission to a next lower transmission ratio in accordance with at least one synchro-shift route in response to receiving the second shift signal;

the controller further configured to:

control only one of the first and second gear changing devices to change the transmission ratio of the bicycle transmission in response to receiving a third shift signal, different from the first shift signal, from the first switch or in response to receiving a fourth shift signal, different from the second shift signal, from the second switch.

2. The bicycle gear changing apparatus of claim 1, wherein the first shift signal is representative of a first way of switching, such as single switching, of the first switch; and wherein the second shift signal is representative of the first way of switching, such as single switching, of the second switch.

3. The bicycle gear changing apparatus of claim 2, wherein the third signal is representative of a second way of switching, different from the first way of switching, such as a double switching or long hold, of the first switch.

4. The bicycle gear changing apparatus of claim 2, wherein the fourth signal is representative of a second way of switching, different from the first way of switching, such as a double switching or long hold, of the second switch.

5. The bicycle gear changing apparatus of claim 3, wherein the second way is representative of a longer holding of the switch than the first way, wherein the controller is configured to determine that the signal is the first shift signal if a time between the switch being actuated and released is less than a predetermined time interval, and to determine that the signal is the third shift signal if the switch has not yet been released after the predetermined time interval.

6. The bicycle gear changing apparatus of claim 3, wherein the first shift signal is representative of a first switching duration of the first switch and the third shift signal representative of a second, longer, switching duration of the first switch, the controller being configured to, upon actuation of the first switch, provisionally determine that the signal is the first shift signal, and start the controlling at least one of the first and second gear changing devices associated with the first shift signal, and to, upon determining that the actuation of the switch is actually representative of the second switching duration, change the determination to that the signal is the third shift signal, abort the controlling at least one of the first and second gear changing devices associated with the first shift signal, and start the controlling only one of the first and second gear changing devices associated with the third shift signal.

7. The bicycle gear changing apparatus of claim 4, wherein the second shift signal is representative of a first switching duration of the second switch and the fourth shift signal representative of a second, longer, switching duration of the second switch, the controller being configured to, upon actuation of the second switch, provisionally determine that the signal is the second shift signal, and start the controlling at least one of the first and second gear changing devices associated with the second shift signal, and to, upon determining that the actuation of the second switch is actually representative of the second switching duration, change the determination to that the signal is the fourth shift signal, abort the controlling at least one of the first and second gear changing devices associated with the second shift signal, and start the controlling only one of the first and second gear changing devices associated with the fourth shift signal.

8. The bicycle gear changing apparatus of claim 1, wherein a smallest gear ratio step size achievable with the first gear changing device is smaller than a smallest gear ratio step size achievable with the second gear changing device.

9. The bicycle gear changing apparatus of claim 8, wherein the controller is configured to:

control only the second gear changing device to increase the transmission ratio of the bicycle transmission in response to receiving the third shift signal.

10. The bicycle gear changing apparatus of claim 8, wherein the controller is configured to:

control only the second gear changing device to decrease the transmission ratio of the bicycle transmission in response to receiving the fourth shift signal.

11. The bicycle gear changing apparatus of claim 8, wherein the controller is configured to:

control only the second gear changing device to shift to a next higher transmission ratio of the second gear changing device in response to receiving the third shift signal, and in case the transmission ratio of the second gear changing device is already maximum, control only the first gear changing device to shift to a transmission ratio higher than the next higher transmission ratio of the first gear changing device in response to receiving the third shift signal.

12. The bicycle gear changing apparatus of claim 8, wherein the controller is configured to:

control only the second gear changing device to shift to a next lower transmission ratio of the second gear changing device in response to receiving the fourth shift signal, and in case the transmission ratio of the second gear changing device is already minimum, control only the first gear changing device to shift to a transmission ratio lower than the next lower transmission ratio of the first gear changing device in response to receiving the fourth shift signal.

13. The bicycle gear changing apparatus of claim 8, wherein the first gear changing device is an electrically actuatable rear derailleur, and the second gear changing device is an electrically actuatable internal hub transmission or electrically actuatable internal crank transmission.

14. The bicycle gear changing apparatus of claim 1, wherein:

the first gear changing device and the second gear changing device are included in an electrically actuatable internal hub transmission;

the first gear changing device and the second gear changing device are included in an electrically actuatable internal crank transmission;

the first gear changing device is included in an electrically actuatable internal hub transmission, and the second gear changing device is included in an electrically actuatable internal crank transmission; or the first gear changing device is included in an electrically actuatable internal crank transmission, and the second gear changing device is included in an electrically actuatable internal hub transmission.

15. The bicycle gear changing apparatus of claim 1, wherein the at least one synchro-shifting route includes at least one synchro-upshifting route and at least one synchro-downshifting route, the controller being further configured to control at least one of the first and second gear changing devices in accordance with the synchro-upshifting route in response to receiving the first shift signal, and to control at least one of the first and second gear changing devices in accordance with the synchro-downshifting route in response to receiving the second shift signal.

16. The bicycle gear changing apparatus according to claim 15, wherein the controller is further configured to set at least one synchro-upshift point and at least one synchro-downshift point to provide two distinct synchro-shift routes.

17. A human powered or light electric vehicle, such as a bicycle, comprising the bicycle gear changing apparatus of claim 1.

* * * * *